US012804501B2

(12) United States Patent

Dange et al.

(10) Patent No.: US 12,804,501 B2

(45) Date of Patent: Nov. 17, 2026

(54) METHOD AND APPARATUS FOR MANAGING MASTER CELL GROUP FAILURE IN A WIRELESS COMMUNICATION SYSTEM

(71) Applicant: Samsung Electronics Co., Ltd., Suwon-si (KR)

(72) Inventors: Amit Anandrao Dange, Bangalore (IN); Nishant, Bangalore (IN); Vivek Murugaiyan, Bangalore (IN); Mohammad Umair, Bangalore (IN); Kailash Kumar Jha, Bangalore (IN); Gokul K, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 18/441,514

(22) Filed: Feb. 14, 2024

(65) Prior Publication Data

US 2025/0203482 A1 Jun. 19, 2025

Related U.S. Application Data

(63) Continuation of application No. PCT/KR2024/001745, filed on Feb. 6, 2024.

(30) Foreign Application Priority Data

Feb. 14, 2023 (IN) ............................ 202341009773
Dec. 14, 2023 (IN) ............................ 2023 41009773

(51) Int. Cl.
*H04W 36/30* (2009.01)
*H04W 36/00* (2009.01)

(52) U.S. Cl.
CPC ..... *H04W 36/305* (2018.08); *H04W 36/0058* (2018.08)

(58) Field of Classification Search
None
See application file for complete search history.

(56) References Cited

U.S. PATENT DOCUMENTS 10,805,850 B1 10/2020 Benammar
11,082,903 B2 8/2021 Yun et al.
(Continued)

FOREIGN PATENT DOCUMENTS

CN 114641019 6/2022
EP 3920581 12/2021
KR 10-2022-0137420 10/2022

OTHER PUBLICATIONS

Search Report and Written Opinion dated May 8, 2024 issued in International Patent Application No. PCT/KR2024/001745.
(Continued)

*Primary Examiner* — Anh Vu H Ly

(74) *Attorney, Agent, or Firm* — NIXON & VANDERHYE P.C.

(57) ABSTRACT

The present disclosure provides a method for managing Master Cell Group (MCG) failure by a User Equipment (UE) supporting a dual connectivity in a wireless communication system. The method comprises establishing a radio resource control (RRC) connection with an MCG and a secondary cell group (SCG). The method comprises detecting a failure of the RRC connection with the MCG. The method comprises transmitting, to a network corresponding to the SCG, a connection failure report upon detecting the failure of the RRC connection with the MCG. The method comprises receiving, from the network corresponding to the SCG, RRC reconfiguration information in response to the transmitted connection failure report, wherein the RRC reconfiguration information includes information about configuring the SCG as the MCG.

18 Claims, 9 Drawing Sheets

(56) References Cited

U.S. PATENT DOCUMENTS

| | | | | |
|---|---|---|---|---|
| 2019/0356536 | A1 | 11/2019 | Lee et al. | |
| 2020/0022215 | A1 | 1/2020 | Takahashi et al. | |
| 2020/0059395 | A1 * | 2/2020 | Chen | H04W 28/082 |
| 2020/0260347 | A1 | 8/2020 | Xu et al. | |
| 2020/0305216 | A1 * | 9/2020 | Kim | H04W 76/19 |
| 2020/0351968 | A1 | 11/2020 | Yilmaz et al. | |
| 2022/0110038 | A1 | 4/2022 | Shih | |
| 2024/0298370 | A1 * | 9/2024 | Freda | H04W 40/22 |
| 2025/0016641 | A1 * | 1/2025 | Abraham | H04W 36/0055 |
| 2026/0040179 | A1 * | 2/2026 | Abraham | H04W 36/305 |

OTHER PUBLICATIONS

OPPO, "SON on fast MCG recovery", 3GPP TSG-RAN WG2, Meeting Notes, Meeting #120, Nov. 4, 2020, 4 pages.
Qualcomm Incorporated, "Other aspects of SCG activation/deactivation", 3GPP TSG-RAN WG2, Meeting Notes, Meeting #116, Jan. 11, 2022, 6 pages.
Vivo, "Fast MCG recovery via deactivated SCG", 3GPP TSG-RAN WG2, eeting Notes, Meeting #116, Jan. 11, 2022, 17 pages.
Office Action for IN Application No. 202341009773 dated Mar. 30, 2026, 7 pages.
3GPP TS 38.331 V16.11.0, 3rd Generation Partnership Project; Technical Specification Group Radio Access Network, Release 16, 971 pages, Dec. 2022, NR; Radio Resource Control (RRC) protocol specification.
Lenovo, On NTN NW verified UE location aspects, 3GPP TSG RAN WG2#119-bis-e, 8 pages, Oct. 2022, R2-2210004.

* cited by examiner

Different types of non-terrestrial networks.

METHOD AND APPARATUS FOR MANAGING MASTER CELL GROUP FAILURE IN A WIRELESS COMMUNICATION SYSTEM

CROSS-REFERENCE TO RELATED APPLICATIONS

This application is a continuation of International Application No. PCT/KR2024/001745 designating the United States, filed on Feb. 6, 2024, in the Korean Intellectual Property Receiving Office and claiming priority to Indian Provisional Patent Application No. 202341009773, filed on Feb. 14, 2023, and Indian Complete patent application No. 202341009773, filed on Dec. 14, 2023, in the Indian Patent Office, the disclosures of each of which are incorporated by reference herein in their entireties.

BACKGROUND

Field

The disclosure relates to wireless communication, and for example, relates to methods and systems for managing Master Cell Group (MCG) failure in a network.

Description of Related Art

In mobile communication technology, users are making the pivotal shift from the 4$^{th}$ Generation (4G) to the 5$^{th}$ Generation (5G)/New Radio (NR) technology. This transition is driven by the pursuit of higher data speed, ultra-low latency, enhanced reliability, and expansion of network capacity. In NR, various service-based network access options have been introduced to accommodate an exponential growth in mobile and Internet of Things (IoT) devices. As the number of end users continues to surge, the need for seamless 5G link integration and uninterrupted service continuity has become more vital than ever before.

To optimize network performance by harnessing the capabilities of multiple cell groups of a network, dual connectivity was introduced. In dual connectivity, a User Equipment (UE) has simultaneous connectivity with both a Master Cell Group (MCG) and a Secondary Cell Group (SCG) to experience enhanced data throughput, reliability, and overall connectivity with the network. However, during network access via dual connectivity, link stability/service continuity of a primary cell of the MCG is of vital importance. If the UE loses connection with the primary cell of the MCG which is referred to as MCG failure, the UE may also lose connection with cells of the SCG and has to repeat the cell selection procedure.

During the MCG failure, the UE experiences problems like data interruptions, call drops, and other disruptions, which result in an inferior user experience. Additionally, during these occurrences, the UE uses battery power to re-establish a connection resulting in lower power performance. Therefore, it is crucial to maintain a stable primary cell in the dual connectivity scenario for optimal performance of the UE.

To address MCG failures during dual connectivity, 3GPP release 16 has introduced an MCG failure recovery procedure that enables the UE to attempt to recover failed MCG and stay in a connected mode. However, due to the scarcity of the MCG, many times the MCG recovery procedure fails resulting in the UE moving to an out-of-service state, thereby deteriorating the user experience.

MCG fast recovery and Non-Terrestrial Networks (NTN) are some of those features of Rel-16 and Rel-17 that were aimed at enhancing performance, increasing efficiency, empowering user experiences, and facilitating the connection of additional supporting infrastructure. The MCG fast recovery feature helps the user to recover failure on the MCG connection with the help of a Secondary Cell Group (SCG) connection link and avoid any interruption of service whereas NTN helps by providing service in the area Terrestrial Networks (TN) not able to for service continuity. Currently, the features MCG fast recovery and NTN are used exclusively of each other, e.g., the MCG recovery procedure is performed using TN networks only and does not prioritize NTN carrier as an SCG.

In Rel-15, for a User Equipment (UE) connected with Multiple Radio Access Technology (Multi-RAT) Dual Connectivity (MR-DC), whenever a Master Cell Group (MCG) failure occurred, MCG Radio Link Failure (RLF) was declared for all the MR-DC options and Radio Resource Control (RRC) connection re-establishment was triggered. With Rel-16 onwards, MCG Fast Recovery/Fast MCG Link Recovery was introduced in the 3GPP standards. MCG's fast recovery targets all MRDC architecture options. When MCG failure occurs, UE follows an SCG failure-like procedure, such as:

UE does not trigger RRC connection re-establishment.

UE triggers an MCG failure procedure in which a failure information message is transmitted to the network via SCG.

Furthermore, in Rel-16, 3GPP has introduced NTN, which refers to networks operating through an aerial communication network. Additionally, Rel-17, 3GPP has introduced Radio Access Network (RAN) slicing in which cells can provide specific slice services. For example, as per TS 38.331, System Information Block (SIB) 16 contains configurations of slice-specific information, which is shown below Table-1.

TABLE 1

```
        SIB16-r17 ::=   SEQUENCE {
          freqPriorityListNRSlicing-r17   FreqPriorityListNRSlicing-r17
    OPTIONAL, -- Need R
      lateNonCriticalExtension   OCTET STRING            OPTIONAL,
          ...
        }
FreqPriorityListNRSlicing-r17 ::= SEQUENCE (SIZE (0..maxFreq)) OF
FreqPriorityNRSlicing-r17
FreqPriorityNRSlicing-r17 ::=   SEQUENCE {
   slice InfoList-r17   SliceInfoList-r17                    OPTIONAL,
-- Need R
   ...
}
```

TABLE 1-continued

```
SliceInfoList-r17 ::=   SEQUENCE (SIZE (1..maxSliceInfo-r17)) OF SliceInfo-r17
SliceInfo-r17 ::=   SEQUENCE {
  sliceGroupID-r17   SliceGroupID-r17,
  cellReselectionPriority-r17   CellReselectionPriority
OPTIONAL, -- Need R
  cellReselectionSubPriority-r17   CellReselectionSubPriority
OPTIONAL, -- Need R
  sliceCellListNR-r17   CHOICE {
    sliceAllowCellListNR-r17   SliceCellListNR-r17,
    sliceExcludeCellListNR-r17   SliceCellListNR-r17
  }                                                   OPTIONAL, -- Need R
  ...
}
```

These features have provided multiple service choices for the user as per demand and based on service demand the UE can camp on the TN network as well as the NTN network at the same time with the help of MR-DC to experience the same. As different IE broadcasted in SIB provides the details of service supported by that particular cell/cells, it can be used by the UE to endorse current cells or try to switch another during a fast MCG recovery process using MCGFailureInformation indication for service or connection continuity.

Currently, the cell preference for fast MCG recovery is decided solely based on signal level (Reference Signals Received Power (RSRP), Reference Signals Received Quality (RSRQ), or Signal Interference Noise Ratio (SINR). Several types of service or signal condition support information are not considered to determine service continuity or connectivity of the device.

During fast MCG recovery, there is a possibility that the UE may select a cell based on signal strength alone instead of considering a cell with support RAN slice-specific service which will lead to RAN slice service discontinuity. Also, there is no procedure introduced in the 3GPP specification which will allow the UE to prefer a cell based on ongoing service. Further, selecting a cell on the existing implementation which does not support the RAN slice service instead of selecting a cell which does support the RAN-specific service will lead to service discontinuity. This leads to a bad user experience and compromises on ongoing services while camped on a 5G network using 5G services.

Specifically, the rel-16 MCG failure recovery procedure provides a means for the UE to attempt to recover an MCG cell in which radio link failure (RLF) has occurred. For a UE to initiate the MCG recovery procedure, the UE needs to have either split SRB1 or SRB3 configured. Using this signalling bearer, the UE can directly communicate with a configured SCG cell. During the MCG recovery procedure, the UE will attempt to recover the MCG by communicating with the connected SCG cell.

When either split SRB1 or SRB3 is configured in the UE and an MCG link failure has occurred, the UE can initiate the MCG recovery procedure. During the MCG recovery procedure, the UE reports radio link failure cause, measurement results of serving and configured frequencies in MCGFailureInformation over split SRB1 or SRB3.

The network on processing the MCGFailureInformation, either releases the RRC connection or provides a handover command to a suitable MCG cell for service continuity based on the availability of suitable MCG cells.

However, due to the scarcity of a suitable MCG cell for the UE to get handed over to, the UE moves to the Out of Service (OOS) state and loses the network connections. Any data transmissions during these instances get stalled and calls get dropped.

Therefore, the UE has to start from the beginning and perform measurements to initiate the cell selection procedure. Due to these issues, the MCG radio link failure instances drastically degrade the user experience of the 5G users.

Thus, there is a need to address the above-mentioned problems in the mobile communication network. For example, there is a need to provide methods and systems for managing the MCG failure in the network.

SUMMARY

According to an example embodiment of the present disclosure, a method for managing master cell group (MCG) failure by a user equipment (UE) supporting a dual connectivity in a wireless communication system is disclosed. The method includes establishing a radio resource control (RRC) connection with a MCG and a secondary cell group (SCG). The method includes detecting a failure of the RRC connection with the MCG. The method includes transmitting, to a network corresponding to the SCG, a connection failure report upon detecting the failure of the RRC connection with the MCG. The method includes receiving, from the network corresponding to the SCG, RRC reconfiguration information in response to the transmitted connection failure report. The RRC reconfiguration information includes information about configuring the SCG as the MCG.

According to an example embodiment of the present disclosure, a method for managing master cell group (MCG) failure by an apparatus of a network associated with a secondary cell group (SCG) is disclosed. The method includes establishing a radio resource control (RRC) connection with a user equipment (UE) which established a RRC connection with the MCG. The method includes receiving, from the UE, a connection failure report for the failure of the RRC connection with the MCG. The method includes reconfiguring the SCG as the MCG based on the connection failure report. The method includes generating RRC reconfiguration information corresponding to the reconfiguration of the SCG as the MCG. The method includes transmitting, to the UE, the RRC reconfiguration information.

According to an example embodiment of the present disclosure, a user equipment (UE) supporting a dual connectivity for managing master cell group (MCG) failure in a wireless communication system is disclosed. The UE includes a memory storing instructions and at least one processor configured to, when executing the instructions, cause the UE to perform operations The operations include establishing a radio resource control (RRC) connection with an MCG and a secondary cell group (SCG). The operations include detecting a failure of the RRC connection with the MCG. The operations include transmitting a connection failure report upon detecting the failure of the RRC connection with the MCG to a network corresponding to the SCG. The operations include receiving, from the network corresponding to the SCG, RRC reconfiguration information in response to the transmitted connection failure report, wherein the RRC reconfiguration information includes information about configuring the SCG as the MCG.

According to an example embodiment of the present disclosure, an apparatus of a network associated with a secondary cell group (SCG) for managing master cell group (MCG) failure in a wireless communication system is disclosed. The apparatus includes a memory storing instructions and at least one processor configured to, when executing the instructions, cause the UE to perform operations. The operations include establishing a radio resource control (RRC) connection with a user equipment (UE) which established a RRC connection with the MCG. The operations include receiving, from the UE, a connection failure report for a failure of the RRC connection with the MCG. The operations include reconfiguring the SCG as the MCG based on the connection failure report. The operations include generating RRC reconfiguration information corresponding to the reconfiguration of the SCG as the MCG. The operations include transmitting, to the UE, the RRC reconfiguration information.

To further clarify the advantages and features of the present disclosure, a more detailed description will be rendered by reference to various example embodiments, which are illustrated in the appended drawings. It is appreciated that these drawings simply depict example embodiments and are therefore not to be considered limiting its scope. The disclosure will be described and explained with additional specificity and detail with reference to the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings in which like characters represent like parts throughout the drawings, and in which.

Figure 1:
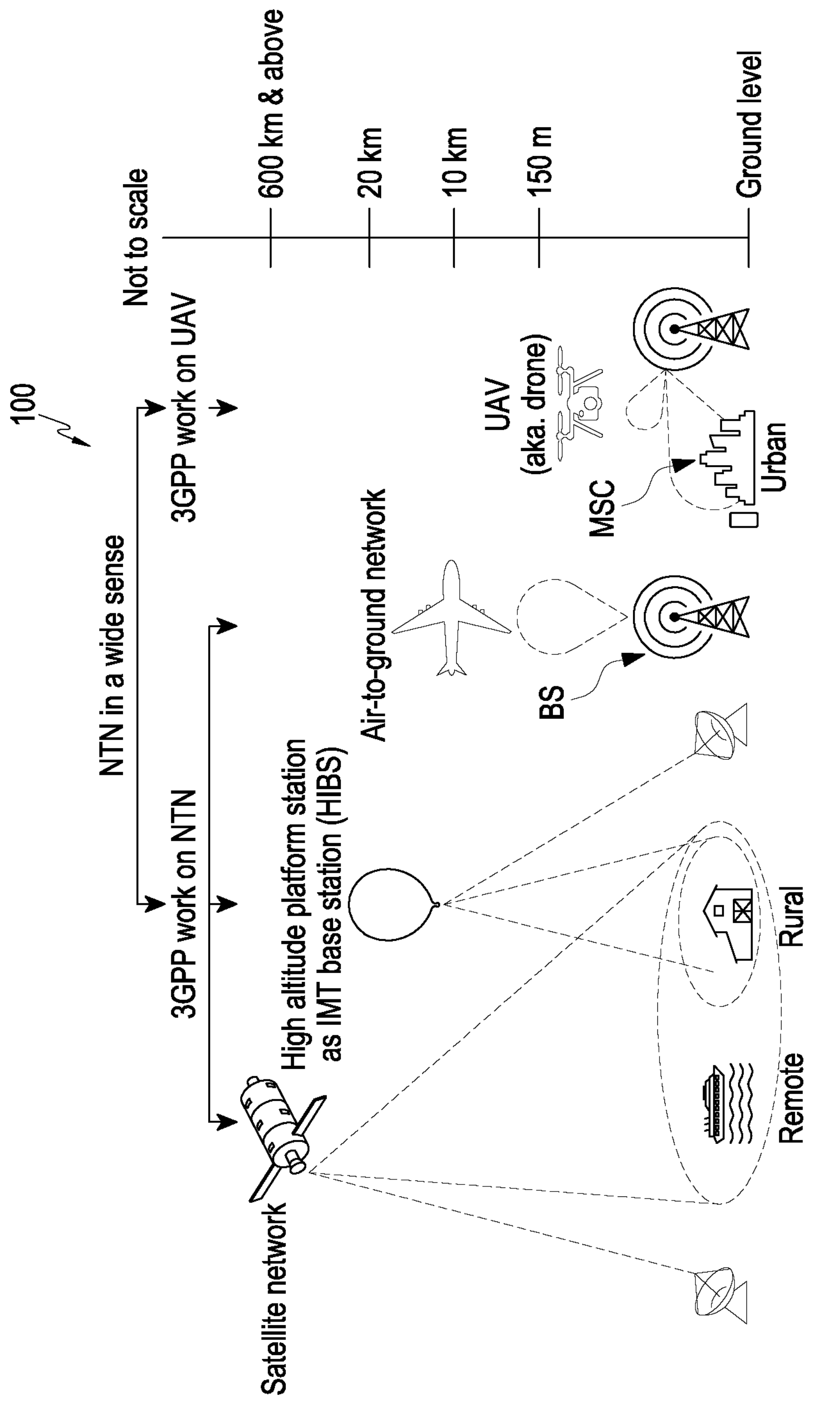
FIG. 1 (PRIOR ART)
FIG. 1 is a diagram illustrating a network environment illustrating Terrestrial Network (TN) and Non-Terrestrial Network (NTN), according to the prior art.

Further, skilled artisans will appreciate that elements in the drawings are illustrated for simplicity and may not have been necessarily drawn to scale. For example, the flowcharts illustrate various method in terms of steps involved to help improve understanding of aspects of the present disclosure. Furthermore, in terms of the construction of the device, one or more components of the device may have been represented in the drawings by conventional symbols, and the drawings may show only those specific details that are pertinent to understanding the various embodiments of the present disclosure so as not to obscure the drawings with details that will be readily apparent to those of ordinary skill in the art having the benefit of the description herein.

DETAILED DESCRIPTION

It should be understood at the outset that although example implementations of the various embodiments of the present disclosure are illustrated below, the present disclosure may be implemented using any number of techniques, whether currently known or in existence. The present disclosure should in no way be limited to the example implementations, drawings, and techniques illustrated below, including the example design and implementation illustrated and described herein, but may be modified within the scope of the disclosure, including the appended claims along with their full scope of equivalents.

The term "some" as used herein may refer, for example, to "none, or one, or more than one, or all." Accordingly, the terms "none," "one," "more than one," "more than one, but not all" or "all" would all fall under the term "some." The term "some embodiments" may refer to no embodiments, to one embodiment, to several embodiments, or to all embodiments. Accordingly, the term "some embodiments" may refer to "no embodiment, or one embodiment, or more than one embodiment, or all embodiments."

The terminology and structure employed herein is for describing, teaching, and illuminating various embodiments and their specific features and elements and does not limit, restrict, or reduce the spirit and scope of the disclosure, including the claims or their equivalents.

For example, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features", "one or more elements", "at least one feature", or "at least one element." Furthermore, the use of the terms "one or more" or "at least one" feature or element does NOT preclude there being none of that feature or element, unless otherwise specified by limiting language such as "there NEEDS to be one or more", or "one or more element is REQUIRED."

Unless otherwise defined, all terms, and especially any technical and/or scientific terms, used herein may be taken to have the same meaning as commonly understood by one of ordinary skill in the art.

Example embodiments of the present disclosure will be described in greater detail below with reference to the accompanying drawings.

FIG. 1 is a diagram illustrating a network environment 100 illustrating Terrestrial Network (TN) and Non-Terrestrial Network (NTN), according to the prior art. Furthermore, the NTN, as illustrated in FIG. 1, may refer, for example, to networks operating through an air/spaceborne vehicle for communication. The applications of the NTN may be divided into 3 categories, which are mentioned below:

- Service continuity: The NTN may provide service continuity in areas where communication service is otherwise infeasible, such as, in rural areas, deserts, forests, oceans, etc.
- Service ubiquity: The NTN may provide communication service during disasters or outages in TNs.
- Service scalability: The NTN may also offload traffic from the TN.

The network environment 100 includes the TN and the NTN. The TN includes one or more Public Land Mobile Networks (PLMNs). Each PLMN includes a Mobile Switching Centre (MSC), a number of cell site antennas, or one or more Base Stations (BS). MSCs and PLMNs may communicate over a network connection which may include a physical connection or a wireless connection.

In 3GPP, the NTN may include a network such as, but is not limited to, a satellite-based cellular network, a high altitude platform station-based cellular network, or an air-to-ground-based network. In various embodiments, the NTN may also include an Unmanned Aerial Vehicle (UAV)-based cellular network.

The various example embodiments illustrated in FIG. 1 are examples, and the TN and/or NTN may include any corresponding communication network/interface, as applicable.

Figure 2A:
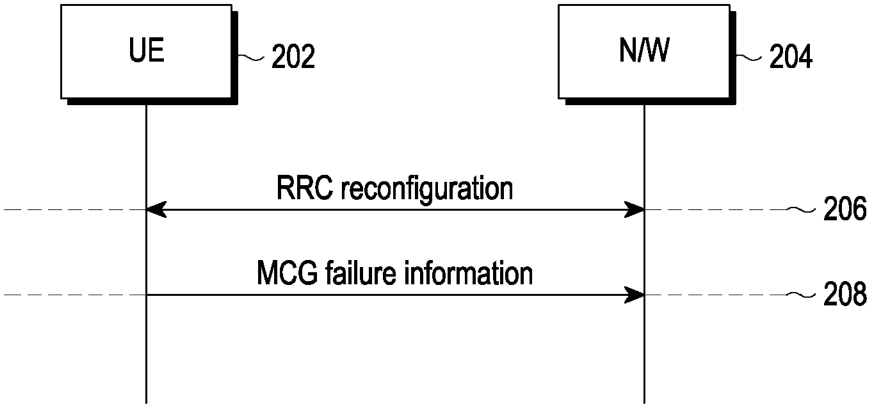
FIG. 2A (PRIOR ART)
FIG. 2A is a signal flow diagram illustrating operations depicting a Master Cell Group (MCG) failure procedure, according to the prior art.

FIG. 2A is a signal flow diagram illustrating operations depicting a Master Cell Group (MCG) failure procedure, according to the prior art. FIG. 2 illustrates the MCG failure procedure in accordance with the 3GPP Technical Specification (TS) 38.331.

The sequence of operations may correspond to a method that is performed between a User Equipment (UE) 202 and a network (N/W) 204. References herein to the NR NAS 103 and/or the network 105 may correspond to respective devices (e.g., base stations) configured to implement operations performed by the NR NAS 103 and/or the network 105. In an embodiment, the UE 202 may refer to a mobile device or a terminal, designed for transmitting and receiving data over a wireless network. Examples of the UE 202 may include a wide range of devices such as, but not limited to, smartphones, tablets, laptops, and Internet of Things (IoT) devices, each equipped with wireless communication capabilities. The UE 202 may be configured to establish connections, communicate with network infrastructure, and access various services, applications, and data through wireless protocols and technologies, including but not limited to cellular, Wi-Fi®, and Bluetooth®, in compliance with the specifications and standards governing the network 204. Further, the network 204 may represent a group of different networks.

Further, the network 204 may correspond to respective components such as, but not limited to, a Mobile Switching Centre (MSC), a base station, and so forth. The term base station may generally refer to a fixed station that communicates with UE 202 and/or other base stations and may exchange data and control information by communicating with the UE 202 and/or other base stations. In a non-limiting example, the base station may also be referred to as a Node B, an evolved-Node B (eNB), a next-generation Node B (gNB), a sector, a site, a base transceiver system (BTS), an access point (AP), a relay node, a remote radio head (RRH), a radio unit (RU), a small cell, or the like. In the present disclosure, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range.

The UE 202 may operate in dual connectivity mode, e.g., may be connected to both a Master Cell Group (MCG) or a primary cell of the network 204 and a Secondary Cell Group (SCG). The MCG and/or the primary cell may act as a master cell that utilizes cells of the SCG to increase scalability, performance, and overall throughput of the network 204. The SCG may act as a supporting celling group that is configured to support various operations performed by the MCG and/or the primary cell.

At step 206, a Radio Resource Control (RRC) reconfiguration is performed between the UE 202 and the network (N/W) 204. The UE 202 may establish an RRC connection with the network 204 in the dual connectivity mode. At step 208, the UE 202 informs the network 204 about an MCG failure that has been experienced by the UE 202. Specifically, when the UE 202 identifies that the MCG radio link has failed, the UE 202 may transmit MCG failure information (MCGFailureInformation) to the network 204 to indicate the same. According to the conventional technique, when the UE 202 encounters the MCG radio link failure, the UE 202 loses both the cells corresponding to the MCG and the SCG and moves to no service state. To acquire a connection again, the UE 202 has to perform a cell selection procedure from the no-service state.

Further, if the UE 202 is operating in an RRC_CONNECTED mode, with split SRB1 or SRB3 configured, the UE 202 may initiate the fast MCG link recovery procedure upon experiencing the MCG radio link failure to continue the RRC connection without re-establishment. However, due to the scarcity of a suitable MCG cell for the UE 202 to get handed over to, the UE 202 moves to the Out-of-Service (OOS) state and loses the network connections. Further, any data transmissions during these instances get stalled and calls get dropped.

A format of the MCGFailureInformation in accordance with 3GPP specification TS 38.331 Release-16, is as follows:

```
MCGFailureInformation-r16-IEs ::= SEQUENCE {
   failureReportMCG-r16    FailureReportMCG-r16                    OPTIONAL,
   lateNonCriticalExtension    OCTET STRING                    OPTIONAL,
   nonCriticalExtension    SEQUENCE { }                    OPTIONAL
}
FailureReportMCG-r16 ::=    SEQUENCE {
   failureType-r16    ENUMERATED {t310-Expiry, randomAccessProblem, rlc-M
axNumRetx,
                 t312-Expiry-r16, lbt-Failure-r16, beamFailureRecoveryF
ailure-r16,
              bh-RLF-r16, spare1}
   OPTIONAL,
   measResultFreqList-r16    MeasResultList2NR
      OPTIONAL,
   measResultFreqListEUTRA-r16    MeasResultList2EUTRA
         OPTIONAL,
   measResultSCG-r16    OCTET STRING (CONTAINING MeasResultSCG-Failur
e)  OPTIONAL,
   measResultSCG-EUTRA-r16    OCTET STRING
         OPTIONAL,
   measResultFreqListUTRA-FDD-r16    MeasResultList2UTRA
            OPTIONAL,
   ...
}
```

Figure 2B:
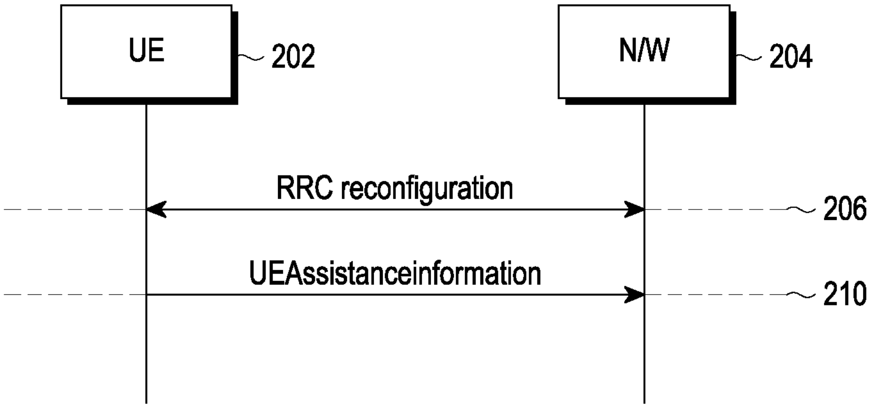
FIG. 2B (PRIOR ART)
FIG. 2B is a signal flow diagram illustrating operations depicting sharing of User Equipment (UE) assistance information by the UE, according to the prior art.

FIG. 2B is a signal flow diagram illustrating operations depicting sharing of User Equipment (UE) assistance information by the UE 200, according to the prior art.

Specifically, at step 210, the UE 202 may also transmit to the network 204 UE assistance information (UEAssistanceInformation). The UEAssistanceInformation is a special RRC message by which the UE 202 can inform various internal statuses to the network 204 so that the network 204 may assign/control resources which are a better fit for the specific moment of each connected UE 202. The UE 202 may use the UEAssistanceInformation to report an internal state of the UE 202 to the network 204. The UE 202 may transmit the UEAssistanceInformation message after successfully performing the RRC reconfiguration procedure to assist the network 204 in configuring parameters for the UE 202. In various embodiments, the UEassistanceinformation may be used by the UE to save power, mitigate overheating, perform measurement, and other required purposes.

A format of UEAssistanceInformation in accordance with 3GPP specification TS 38.331 Release-17, is as follows:

```
   UEAssistanceInformation:: =              SEQUENCE {
   criticalExtensions                    CHOICE {
      ueAssistanceInformation                     UEAssistanceInformation-IEs,
      criticalExtensionsFuture               SEQUENCE { }
   }
}
UEAssistanceInformation-IEs ::=              SEQUENCE {
   delayBudgetReport                DelayBudgetReport                OPTIONAL,
   lateNonCriticalExtension             OCTET STRING                    OPTIONAL,
   nonCriticalExtension              UEAssistanceInformation-v1540-IEs           OPTIONA
L
}
UEAssistanceInformation-v1540-IEs ::= SEQUENCE {
   overheatingAssistance               OverheatingAssistance                OPTIONAL,
   nonCriticalExtension              UEAssistanceInformation-v1610-IEs           OPTIONA
L
}
```

Figure 3:
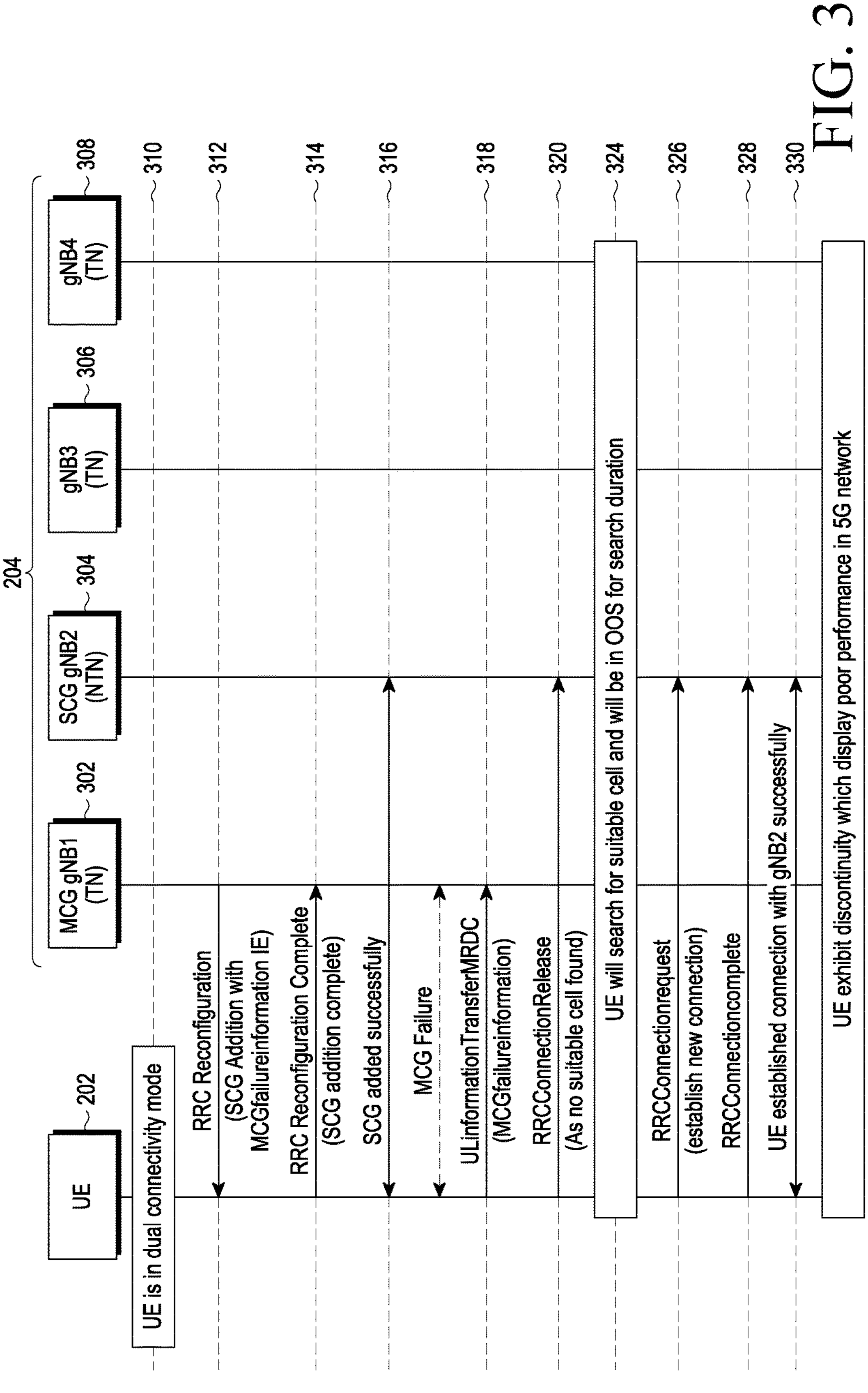
FIG. 3 (PRIOR ART)
FIG. 3 is a signal flow diagram illustrating an MCG recovery procedure, according to the prior art.

FIG. 3 is a signal flow diagram illustrating the MCG recovery procedure, according to the prior art. Specifically, FIG. 3 illustrates a first problem scenario in conventional technique for an overlook of a switch from SCG to MCG. Step 310 indicates that the UE 202 is operating in a dual connectivity mode e.g., the UE 202 is connected to an MCG and an SCG. Here, the MCG corresponds to a TN cell (gNB1) and the SCG corresponds to an NTN cell (gNB2). Specifically, with the introduction of the 5G NTN network, the UE 202 may operate in the dual connectivity mode with the TN cell and NTN cell. When a TN cell is configured as a primary/MCG cell, a radio connection may be relatively stable due to the proximity and immobile nature of TN. When the UE 202 is connected to a 5G TN MCG cell, the UE 202 may be configured with a 5G NTN SCG cell depending on the availability of the satellite coverage. Further, during the addition of a 5G NTN SCG cell, the MCG failure recovery procedure may be configured for the UE 202. However, the UE 202 may experience a similar problem when the MCG corresponds to an NTN cell and the SCG corresponds to a TN cell. Further, the MCG, SCG, or other cells such as, gNB3 and gNB4 308 may correspond to the network 204.

Step 312 indicates that the network 204 and/or the MCG 302 may transmit RRC reconfiguration information to the UE 202. The RRC reconfiguration information may indicate an addition of the SCG 304, as the UE 202 is operating in the dual connectivity mode. Further, the RRC reconfiguration information may also indicate that the network 204 and/or the MCG 302 has configured an MCG failure information element (MCGFailureInformation IE) to support a fast MCG failure recovery process.

The network 204 may configure the fast MCG failure recovery process for the UE 202 having split Signaling Radio Bearers (SRB1 or SRB3) established successfully. At step 314, the UE 202 may indicate the successful completion of RRC reconfiguration. Step 316 indicates that the SCG 304 has been successfully added, e.g., the SCG 304 is now configured to support the UE 202. The MCG 302 may control one or more operations of the SCG 304 based on the requirements.

If the UE 202 detects a Radio Link Failure (RLF) for the MCG 302 (which may also be referred to as MCG failure), the UE 202 may report MCGFailure Information over the split SRB1 bearer and set the primary path to SCG, as shown in step 318. The RLF may be a result of a weaker radio channel condition during which the UE 202 is in a mobility state. Further, the UE 202 transmits the MCGFailureInformation as a result of the MCG failure recovery procedure configured by the network 204 for the UE 202. In case the split SRB1 bearer is not configured, the UE 202 may send the MCGFailureInformation by encapsulating the MCGFailureInformation within the ULInformationTransferMRDC message over the SRB3 bearer to the network 204. The MCGFailureInformation may include information indicating a cause of failure/RLF along with measurement result measurements on NR/LTE frequencies by the UE 202. While reporting the available cells for Main Network (MN)/MCG, the UE 202 may include cells with best-measurement results. Specifically, the UE 202 may sort the cells based on the respective measurement results. The UE 202 may order/sort the cells based on Synchronous Signal and Physical Broadcast Channel (SS/PBCH) block measurement or Channel Strength Indicator-Reference Signal (CSI-RS) measurements for New Radio (NR) candidate cells. Alternatively, the UE 202 may sort/order the cells based on signal strength such as Reference Signal Received Power (RSRP), Reference Signal Received Quality (RSRQ), and Signal to Interference plus Noise Ratio (SINR) for NR/Long Term Evolution (LTE) cells or based on Received Signal Code Power (RSCP), and Energy per chip over Noise Destiny (EcNO) for Universal Terrestrial Radio Access Network (UTRAN) cells.

If there is no suitable cell available for the UE 202 in the network 204, the MCG recovery procedure may fail, and the UE 202 may release the RRC connection as indicated by step 320. The UE 202 may move to a no service state during this condition and any data transmission during this period may be dropped. At step 324, the UE 202 performs a search for any suitable cell to establish a connection and will remain in the OOS state during the search duration.

At step 326, the UE 202 identifies that the NTN SCG gNB2 304 is the only suitable cell available and establishes a connection over the NTN SCG gNB2 304 as the MCG and/or the primary cell. Specifically, at step 326, the UE 202 transmits the RRCConnectionrequest message to the NTN SCG gNB2 304 to establish a new connection as MCG or the primary cell. Upon successful completion of the new connection, the UE 202 may transmit the RRC connection complete message to the NTN SCG gNB2 304, as shown in step 328. Step 330 indicates that the UE 202 has established a successful connection with gNB2.

In the above scenario, the UE 202 has established a connection with the help of SCG 304. However, the UE 202 exhibits discontinuity which results in poor performance of the network 204 and/or loss of information/data. Further, as the presence of the NTN gNB2 cell 304 was known to the UE 202, the UE 202 has to still move to the OOS state and perform cell search again which results in unwanted power and time consumption resulting in a severe performance impact on the network 204.

The UE 202 may experience a similar problem in the scenario when the UE 202 is camped on the NTN MCG and the TN SCG.

Figure 4:
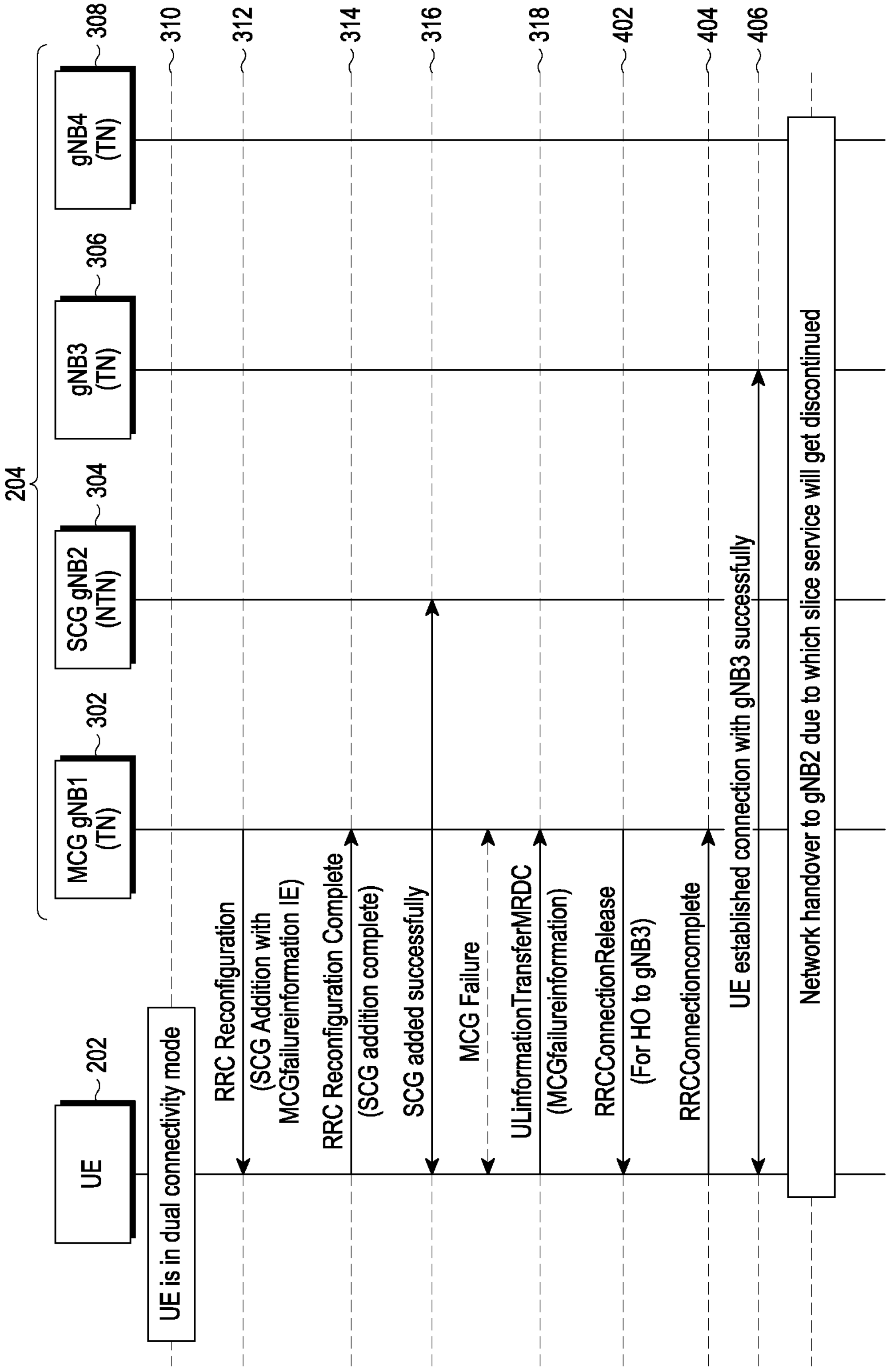
FIG. 4 (PRIOR ART)
FIG. 4 is a signal flow diagram illustrating the MCG recovery procedure, according to the prior art.

FIG. 4 is a signal flow diagram illustrating operations of the MCG recovery procedure, according to the prior art. Specifically, FIG. 4 illustrates a second problem scenario in the convention technique for an overlook of Radio Access Network (RAN) slice cell service during fast MCG recovery. The steps 310, 312, 314, 316 and 318 (which may be referred to herein as steps 310-318) which are similar to the steps being explained with reference to FIG. 3 have been provided with the same reference numerals and a description of these steps may not be repeated here for the sake of brevity. Particularly, at steps 310-318, the UE 202 is in dual connectivity mode and RAN slice-specific service (e.g., Ultra-Reliable and Low Latency Communications (URLLC), enhanced Mobile Broadband (cMBB), enhanced IoT (eIOT), or vehicle-to-everything V2X) is running on the MCG cell 302. Specifically, the UE 202 may be connected to the RAN slice supporting cell of the MCG 302 and/or the SCG 304 to perform the slice-based services. The network 204 may configure the fast MCG recovery for the UE 202 having split SRB1 or SRB3 bearer established successfully. If RLF is detected for the MCG 302, the UE 202 may report the MCGFailureInformation over the split SRB1 bearer and set the primary path to the SCG 304. In case the split SRB1 bearer is not configured, the MCGFailureInformation is sent encapsulated within ULInformationTransferMRDC message over the SRB3 bearer to the network 204. The ULInformationTransferMRDC is a 5G RRC message that is used for the uplink transfer of MR-DC dedicated information. The MR-DC stands for Multi-Radio Dual Connectivity, which is a feature that allows the 202 UE to connect to two different radio access technologies (RATs) simultaneously, such as NR and LTE. The ULInformationTransferMRDC message may include information such as NR or E-UTRA RRC MeasurementReport message or the FailureInformation message. However, while sharing the MCG failure information, the UE 202 may not consider slice-service-based priority.

In the absence of said information, the network 204 may transmit the RRC reconfiguration information indicating a Handover to gNB3 306, as shown by step 402. At step 404, the RRC connection is completed and acknowledged by the UE 202 to the network 204. Step 406 indicates that the UE 202 has established a successful connection with the gNB3 306. However, with network handover to the gNB3 306, the slice services being availed by the UE 202 may be discontinued as gNB3 306 may not be able to support said services and the UE 202 has released a connection with the SCG gNB2 304.

Figure 5:
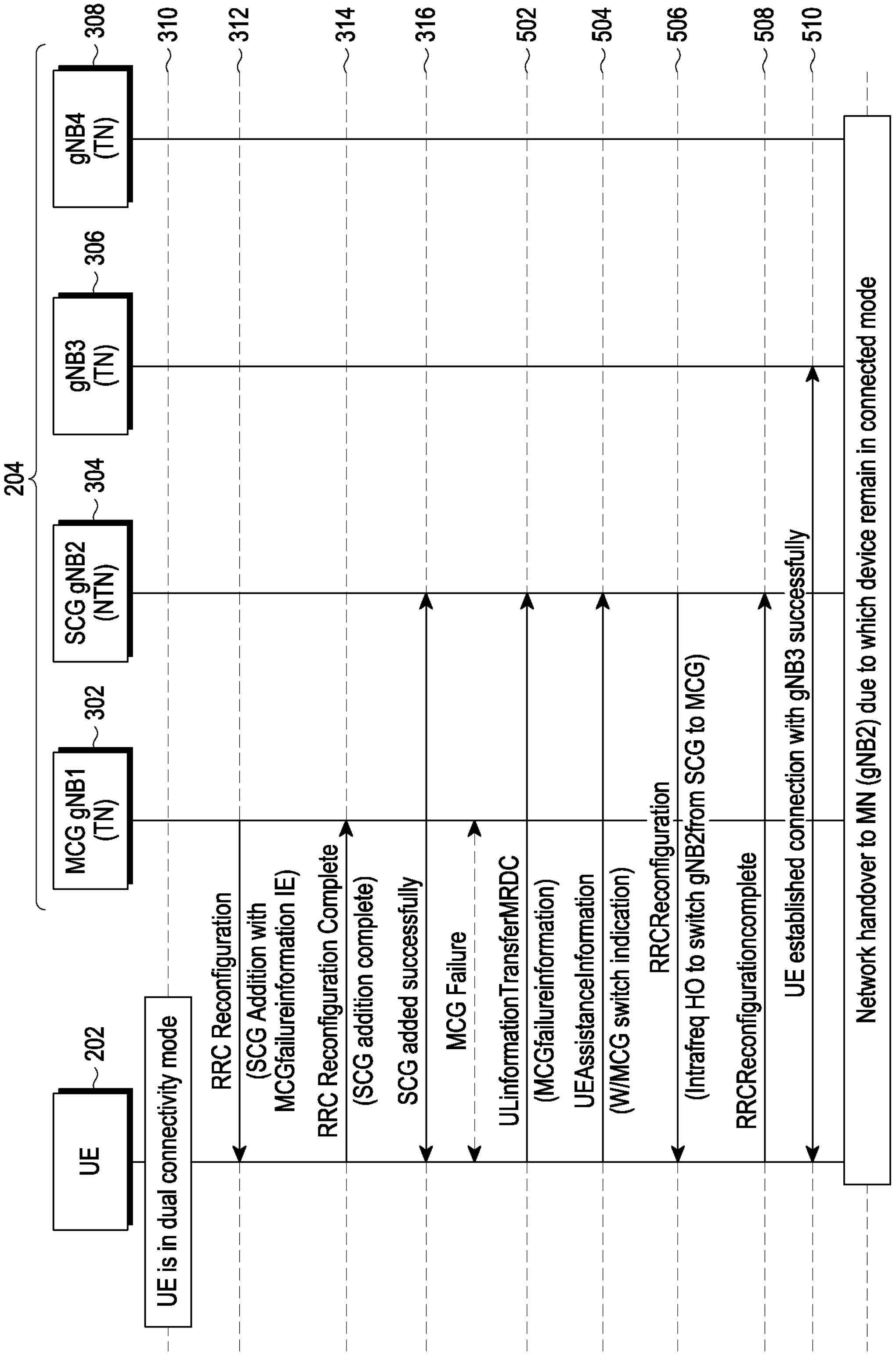
FIG. 5 is a signal flow diagram illustrating an example MCG recovery procedure, according to various embodiments.

FIG. 5 is a signal flow diagram illustrating example operations of an MCG recovery procedure, according to various embodiments. The steps 310, 312, 314 and 316 (which may be referred to as steps 310-316) which are similar to the steps being explained with reference to FIG. 3 have been provided with the same reference numerals and a description of these steps may not be repeated here for the sake of brevity.

For example, FIG. 5 illustrates a solution to the problem scenario illustrated in FIG. 3. Steps 310-316 indicate that the UE 202 is in dual connectivity mode where the TN cell 302 is configured as the MCG and the NTN cell 304 is configured as the SCG. Further, the network 204 has configured the fast MCG recovery procedure for the UE 202.

At step 502, if RLF is detected for the MCG, the UE 202 may report MCGFailureInformation over the split SRB1 bearer and set the primary path to the SCG. In case the split SRB1 bearer is not configured, the MCGFailureInformation may be sent encapsulated within the ULInformationTransferMRDC message over the SRB3 bearer to the network 204. The MCGFailureInformation may include a cause of failure/RLF along with measurement result of measurements on NR/LTE frequencies. The UE 202 may be configured to measure the NR/LTE frequencies by measConfig associated with the MCG. In an embodiment, the network 204 may provide measConfig which contain neighbouring frequencies to measure and report cell that satisfy measurement criteria of the network 204.

At step 504, if the UE 202 is unable to find any suitable MCG cell to recover including the serving cell, then the UE 202 may send the UEAssistanceInformation indicating switching of the current SCG 304 to the MCG. Further, as the UE 202 already has a configuration of the SCG 304, this pre-configured grant can be used to perform Radio Access Channel (RACH) to handover from the SCG 304 to the MCG, as shown by steps 506-508. Specifically, at step 506, the network 204 may transmit RRC reconfiguration with intra-frequency HO information to the gNB2 to switch the SCG to the MCG without releasing the connection. Specifically, in response to the SCG-to-MCG switch request from the UE 202, the network 204 may provide RRC reconfiguration to the UE 202 with the required configuration information. The configuration information may include L2 stack information including, but not limited to, Media Access Control (MAC), Radio Link Control (RLC), or Packet Data Convergence Control (PDCP).

In UEAssistanceInformation, the UE 202 may indicate using a new IE "MCGswitch" (also referred as "SCG-toMCGSwitch-rXX") in bitmap form and with the help of bitmap that the scell/SCG index should be changed to the MCG. Thus, the UE 202 may remain in the connected state and prevent any loss or delay of data packets. Additionally, the UE 202 may perform relaxed measurements, as suitable cells were not available according to the measurement performed during the MCG failure and help the UE 202 to save power by reducing measurement. For example, in the case of dual connectivity mode with a TN cell as the MCG and another TN cell as the SCG, or an NTN cell as the MCG and a TN cell as the SCG. In various embodiments, the UE 202 may use Medium Access Control-Control Element (MAC-CE) to indicate a bitmap change to switch SCG to SCG as per the disclosure. Therefore, procedure disclosed in FIG. 5 may provide better service continuity and a better network experience. Moreover, the disclosure may help the UE 202 to save power by reducing measurement whenever necessary.

In an embodiment, the UEAssistanceInformation including the SCG-to-MCG switch information may be represented as:

```
UEAssistanceInformation ::=            SEQUENCE {
  criticalExtensions                 CHOICE {
    ueAssistanceInformation               UEAssistanceInformation-IEs,
    criticalExtensionsFuture            SEQUENCE { }
  }
}
UEAssistanceInformation-vXX-IEs ::=          SEQUENCE {
  SCG-toMCGSwitch-rXX                   BIT STRING (SIZE (8))  OPTION
AL,
  nonCriticalExtension               SEQUENCE { }  OPTIONAL
}
```

In an embodiment, the RRC reconfiguration message including the SCG-to-MCG reconfiguration may be represented as:

```
RRCConnectionReconfiguration ::= SEQUENCE {
  rrc-TransactionIdentifier   RRC-TransactionIdentifier,
  criticalExtensions    CHOICE {
    c1    CHOICE{
      rrcConnectionReconfiguration-r8    RRCConnection
Reconfiguration-r8-IEs,
      spare7 NULL,
      spare6 NULL, spare5 NULL, spare4 NULL,
      spare3 NULL, spare2 NULL, spare1 NULL
    },
    criticalExtensionsFuture    SEQUENCE { }
  }
}
...
SCG-Configuration-rXX ::=    SEQUENCE {
  MCGSwitch-Indication    ENUMERATED {true}    OPTIONAL, --
Need ON
  pdcp-Config    PDCP-Config OPTIONAL, -- Need ON
  rlc-Config    RLC-Config    OPTIONAL, -- Need ON
  mac-MainConfig    CHOICE {
    explicitValue MAC-MainConfig,
    defaultValue NULL
  }    OPTIONAL, -- Cond HO-toMCG
  physicalConfigDedicated    PhysicalConfigDedicated
OPTIONAL, -- Need ON
}
```

The MAC-CE indicator may be of an 8-bit size where 3 bits contain a MAC sub-header indicating cell group switch purpose with a 2-bit bitmap indicating switching scenario, and the remaining 3 bits are reserved. Once the MAC CE is indicated to the network 204, the network 204 may provide the RRC Reconfiguration to the UE 202 with necessary configuration information for the L2 stack (MAC/RLC/PDCP) similar to the configuration provided during SCG addition.

A frame of MAC-CE indicator used by the UE 202 to indicate the SCG to MCG switch may be represented as follows:

| R/LCID/MAC subheader | X1 | X2 | R | R | R | Oct 1 |
|---|---|---|---|---|---|---|

Figure 6:
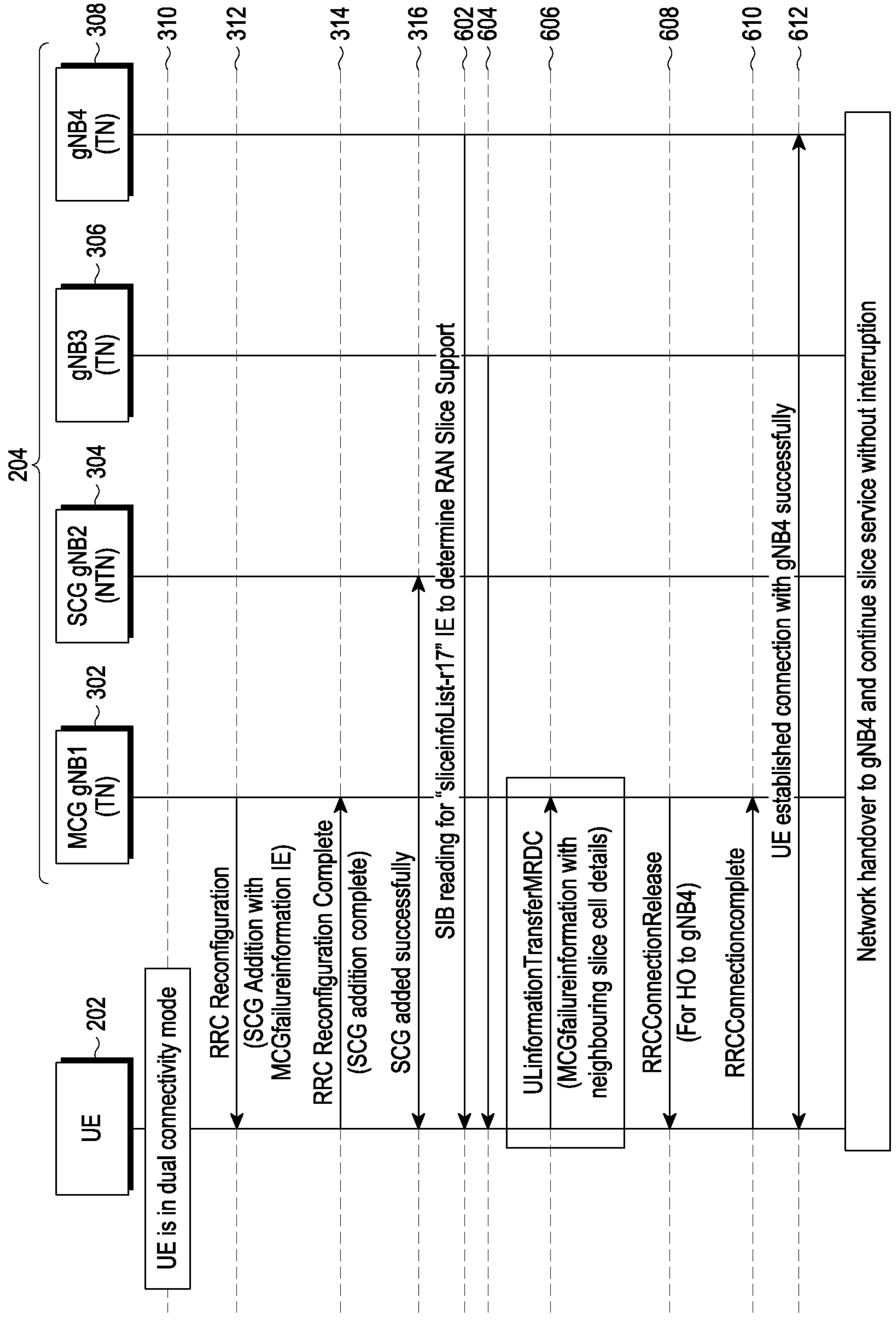
FIG. 6 is a signal flow diagram illustrating an example MCG recovery procedure, according to various embodiments.

MAC subheader: to indicate that payload related to SCG to MCG switch or vice versa
X1: SCG to MCG switch indicator(0 or 1)
X2: MCG to SCG switch indicator (0 or 1)
R: Reserved FIG. 6 is a signal flow diagram illustrating example operations of an MCG recovery procedure, according to various embodiments. FIG. 6 corresponds to addressing the problem of an overlook of RAN slice cell service during fast MCG recovery, as shown in FIG. 4. The steps 310-316 which are similar to the steps being explained with reference to FIG. 3 have been provided with the same reference numerals and a description of these steps may not be repeated here for the sake of brevity.

Specifically, steps 310-316 indicate that the UE 202 is in dual connectivity mode and one RAN slice-specific service is running on MN/MCG cell 302. Further, the network 204 may configure the fast MCG recovery procedure for the UE 202 having split SRB1 or SRB3 bearer established successfully.

If RLF is detected for MCG, the UE 202 may report the MCGFailureInformation over the split SRB1 bearer and set the primary path to SCG. In case the split SRB1 bearer is not configured, the MCGFailureInformation is encapsulated within the ULInformationTransferMRDC message and sent to the network 204.

Further, with the operations disclosed in FIG. 6, at steps 602-604, the UE 202 may identify RAN slice-supported neighbouring cells from the SIB16 broadcast message while sending measurements over the MCGFailureInformation. The UE 202 may prioritize cells supporting the RAN slice over other neighbouring cells and transmit said information with the MCGFailureInformation, as shown by step 606. The network 204 may use this information and respond with an RRCReconfiguration message or encapsulate the same within DLInformationTransferMRDC with target cell information based on the preferred cell reported previously, as shown by step 608. Further, the UE 202 may select the preferred cell and continue the RAN slice service without any interruption, as indicated by steps 610-612. Thus, the disclosure provides a better RAN slice service continuity to the users and gives a better user experience of the network.

The disclosed method has several advantages, but are not limited to, some of which are listed below.

The present disclosure provides connection continuity and service continuity select cells supporting ongoing RAN slice service. Further, the present disclosure provides a solution to the UE 202 to effectively switch the SCG cell to the MCG without any interruption. Thus, the present disclosure provides a better user experience during MCG failure recovery. Moreover, the present disclosure enables the UE 202 to continue the RAN slice service after MCG failure by selecting a neighbour cell supporting this service if serving the MCG cell is not suitable.

Figure 7:
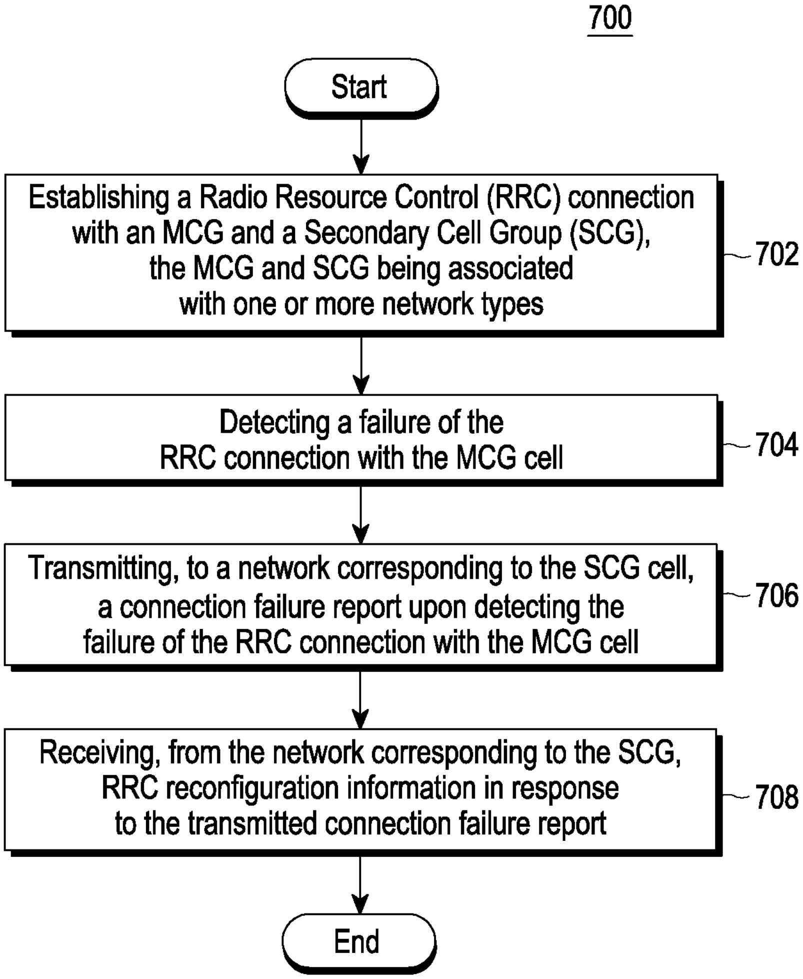
FIG. 7 is a flowchart illustrating an example method for managing MCG failure by a User Equipment (UE), according to various embodiments.

FIG. 7 is a flowchart illustrating an example method 700 for managing MCG failure by the UE 202, according to various embodiments.

At step 702, the method 700 may include establishing the RRC connection with the MCG and the SCG of the network 204. The MCG and SCG of the network 204 may be associated with one or more network types, for example, a TN or an NTN. For example, the MCG may correspond to any of the TN or the NTN. Similarly, the SCG may correspond to any of the TN or the NTN. By establishing the connection with the MCG and SCG, the UE 202 may operate in the dual connectivity mode.

At step 704, the method 700 may include detecting a failure of the RRC connection with the MCG cell. The failure may correspond to RLF or the MCG failure, as discussed above. The failure of the RRC connection may be caused due to mobility of the UE 202 and/or the instability of the NTN.

At step 706, the method 700 may include transmitting, to a network corresponding to the SCG cell, a connection failure report upon detecting the failure of the RRC connection with the MCG cell. The connection failure report may include information, such as, but not limited to, an indication of the failure of the RRC connection, a reason of the failure of the RRC connection, or a neighbouring cell measurement report indicating at least a signal strength of one or more neighbouring cell groups of the UE. In various embodiments, the method 700 may also include transmitting, to the network corresponding to the SCG, UE assistance information indicating at least a preference for configuring the SCG as the MCG, and a status report of the UE 202. In an embodiment, the UE assistance information may include configuration information required for configuring the SCG as the MCG. The configuration information may include measurement information as collected by the UE 202 and/or the MCG, the mobility management information, resource allocation information, Quality of Service (QOS) information, beamforming and antenna management information, interference management information, handover-related information, and so forth. The configuration information may assist the SCG to serve the UE 202 as the MCG.

At step 708, the method 700 may include receiving, from the network corresponding to the SCG, RRC reconfiguration information in response to the transmitted connection failure report or the UE assistance information. The RRC reconfiguration information may indicate that the SCG has been reconfigured as the MCG.

Embodiments are non-limiting examples and the steps of the method 700 as shown in FIG. 7 may occur in variations to the sequence in accordance with various embodiments.

Figure 8:
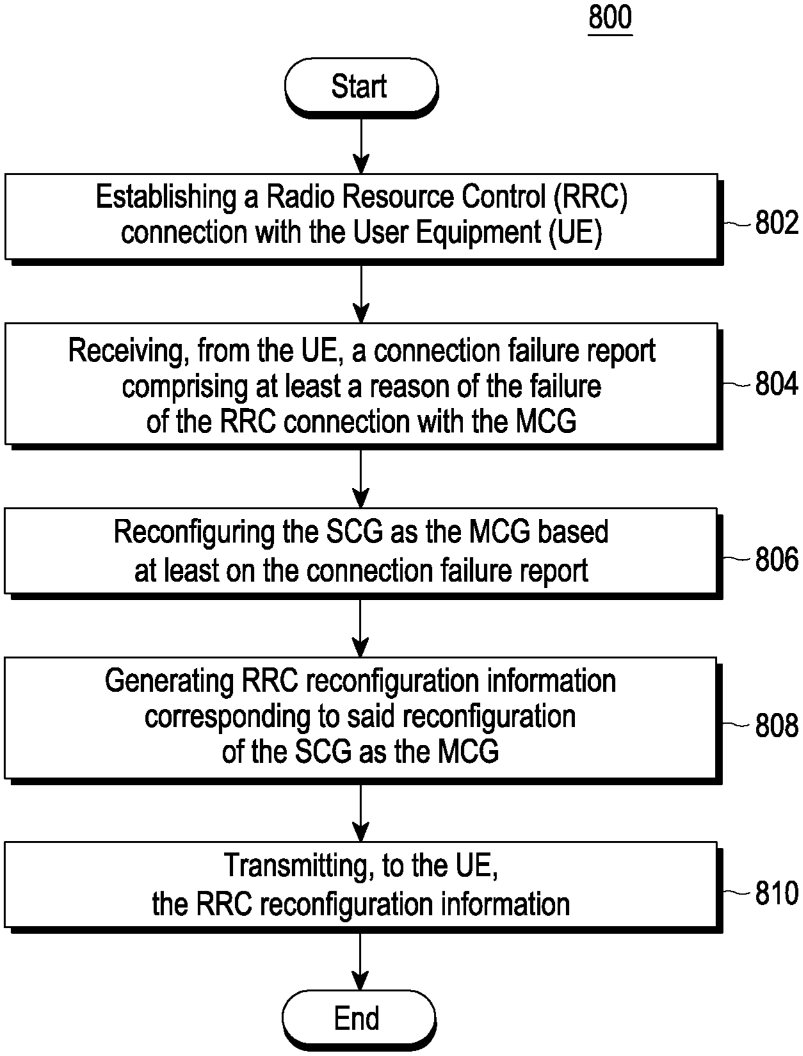
FIG. 8 is a flowchart illustrating an example method for managing MCG failure by a network, according to various embodiments.

FIG. 8 is a flowchart illustrating an example method 800 for managing MCG failure by a network 204, according to various embodiments. The network 204 may include at least an MCG and an SCG to enable dual connectivity of the UE 202 with the network 204.

At step 802, the method 800 may include establishing an RRC connection with the UE 202. In an example embodiment, the method 800 includes establishing an RRC connection with each of the MCG and the SCH of the network 204. The MCG and SCG of the network 204 may be associated with one or more network types, for example, a TN or an NTN. For example, the MCG may correspond to any of the TN or the NTN. Similarly, the SCG may correspond to any of the TN or the NTN.

At step 804, the method 800 may include receiving a connection failure report from the UE 202. The connection failure report may include information such as, but not limited to, a reason of the failure of the RRC connection with the MCG. In an embodiment, the connection failure correspond to the MCGFailureInformation IE, as discussed above. Further, the connection failure report may include about neighbouring cell measurement report indicating at least a signal strength of one or more neighbouring cell groups of the UE 202. In such a case, the connection failure report may correspond to the UEAssistanceInformation IE.

At step 806, the method 800 may include reconfiguring the SCG as the MCG based at least on the connection failure report. In an embodiment, the method 800 may also include receiving the UE assistance information indicating at least a preference for configuring the SCG as the MCG, and a status report of the UE 202, from the UE 202. Further, the method 800 may include reconfiguring the SCG as the MCG based at least on the connection failure report and the UE assistance information. In various embodiments, the method 800 may include determining to reconfigure at least one of the SCG or the one or more neighbouring cell groups as the MCG based on the neighbouring cell measurement report included in the UE assistance information. In an embodiment, the method 800 may include receiving Physical Uplink Shared Channel (PUSCH) data containing Medium Access Control-Control Element (MAC-CE) indication of at least a preference for configuring the SCG as the MCG, and a status report of the UE 202, from the UE 202. Further, the method 800 may include reconfiguring the SCG as the MCG based on the connection failure report and the PUSCH data.

At step 808, the method 800 may include generating RRC reconfiguration information corresponding to said reconfiguration of the SCG as the MCG. At step 810, the method 800 may include transmitting, to the UE 202, the RRC reconfiguration information.

Embodiments are non-limiting examples and the steps of the method 800 as shown in FIG. 8 may occur in variations to the sequence in accordance with various embodiments.

Figure 9:
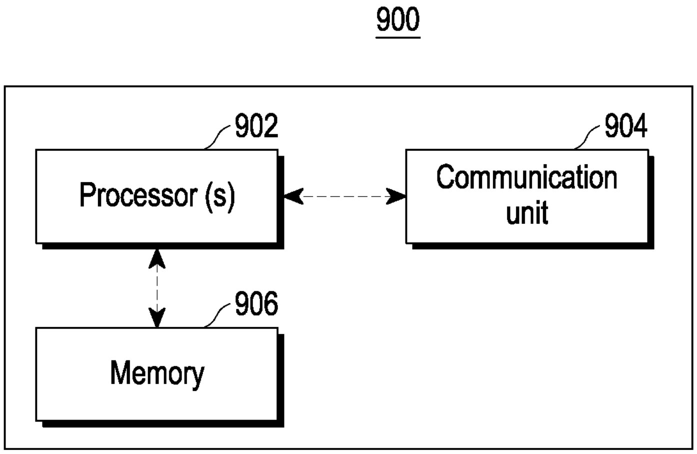
FIG. 9 is a block diagram illustrating an example configuration of the UE in a wireless communication system, according to various embodiment.

FIG. 9 is a block diagram illustrating an example configuration of a UE 900 (also referred as a system 900) in a wireless communication system, according to various embodiments. The configuration of FIG. 9 may be understood as a part of the configuration of the UE 900. Further, the method 700 as disclosed above may be implemented in the UE 900 according to an embodiment. In an embodiment, the UE 900 corresponds to the UE 202.

Referring to FIG. 9, the UE 900 may include at least one processor (e.g., including processing circuitry) 902, a communication unit (e.g., including communication circuitry) 904 (e.g., communicator or communication interface), and a memory 906. By way of example, the UE 900 may be a User Equipment, such as a cellular phone or other device that communicates via communication circuitry (e.g., including a communication unit 904) over a plurality of cellular networks (such as a 3G, 4G, 5G or pre-5G, 6G network or any future wireless communication network). The communication unit 904 may include various communication circuitry and perform functions for transmitting and receiving signals via a wireless channel.

As an example, the processor 902 may be a single processing unit or a number of units, all of which could include multiple computing units. The processor 902 may be implemented as one or more microprocessors, microcomputers, microcontrollers, digital signal processors, central processing units, state machines, logic circuitries, and/or any devices that manipulate signals based on operational instructions. Among other capabilities, the processor 902 is configured to fetch and execute computer-readable instructions and data stored in the memory 906. The processor 902 may include one or a plurality of processors. At this time, one or a plurality of processors 902 may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). The one or a plurality of processors 902 may control the processing of the input data in accordance with a predefined operating rule or Artificial Intelligence (AI) model stored in the non-volatile memory and the volatile memory, e.g., memory 906. The predefined operating rule or AI model is provided through training or learning. The processor 902 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 906 may include any non-transitory computer-readable medium known in the art including, for example, volatile memory, such as Static Random Access Memory (SRAM) and Dynamic Random Access Memory (DRAM), and/or non-volatile memory, such as Read-Only Memory (ROM), erasable programmable ROM, flash memories, hard disks, optical disks, and magnetic tapes.

Embodiments are examples, and the UE 900 may include additional components required to implement the desired functionality of the UE 900 in accordance with the requirements of the present disclosure.

Figure 10:
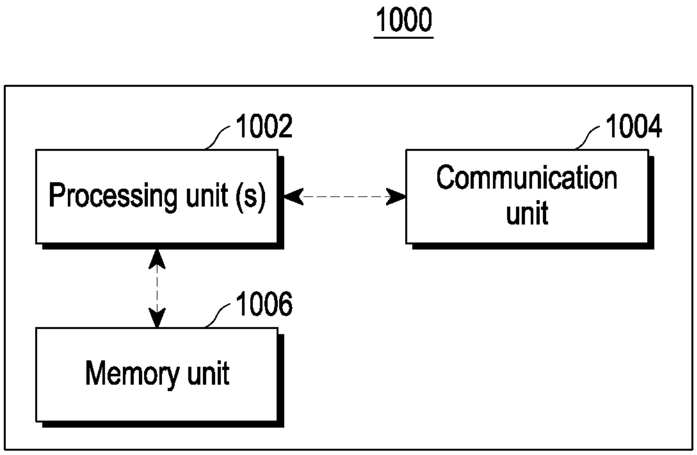
FIG. 10 is a block diagram illustrating an example configuration of a network, according to various embodiments.

FIG. 10 is a block diagram illustrating an example configuration of (an apparatus of) a network 1000 (also referred as a system 1000), according to various embodiments. The network 1000 may correspond to any suitable network type such as, but not limited to, 5G network, 6G network, and so forth. The network 1000 may include TNs and NTNs. The network 1000 may correspond to network elements/components as discussed throughout the disclosure. The network 1000 may include at least one processing unit (e.g., including processing circuitry) 1002, a communication unit (e.g., including communication circuitry) 1004, and a memory unit (e.g., including a memory) 1006. Further, the network 1000 may also include the Cloud-RAN (C-RAN), a Central Unit (CU), a core Network (NW), a Distributed Unit (DU), or the any other possible network (NW) entity. The communication unit 1004 may include various communication circuitry and perform one or more functions for transmitting and receiving signals via a wireless channel. The memory unit 1006 may be configured to store information/data required by the processing unit 1002 to perform one or more desired functionalities of the network 1000 in accordance with the present disclosure.

The processing unit 1002, the communication unit 1004, and the memory unit 1006 may have similar structure as disclosed in reference to the processor 902, the communication unit 904, and the memory 906 of the UE 900, respectively. Accordingly, a detailed description of these components may not be repeated here for the sake of brevity.

Various example embodiments disclosed herein may be implemented using processing circuitry. For example, various example embodiments disclosed herein may be implemented using at least one software program running on at least one hardware device and performing network management functions to control the elements.

The present disclosure provides seamless connectivity to the users and enhances the 5G experience during Dual-Connectivity (DC) between terrestrial and non-terrestrial networks. The present disclosure prevents/blocks the UE from moving to the OOS state during radio link failure in a dual connectivity scenario. Further, the present disclosure provides robust connectivity using TN and NTN inter-networking and keeps the RRC connection of the UE intact with the help of any suitable network. Moreover, the present disclosure prevents/reduces the loss of data packets and/or any delay in the transmission of the data packets during radio link failure.

While specific language has been used to describe the disclosure, any limitations arising on account of the same are not intended. As would be apparent to one skilled in the art, various working modifications may be made to the method in order to implement various aspects of the disclosure as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for managing master cell group (MCG) failure by a user equipment (UE) supporting a dual connectivity scenario in a wireless communication system, the method comprising:

establishing a radio resource control (RRC) connection with an MCG and a secondary cell group (SCG);

detecting a radio link failure (RLF) for the MCG;

transmitting, to a network corresponding to the SCG, MCG failure information upon detecting the RLF for the MCG;

transmitting, to a network corresponding to the SCG, UE assistance information or Medium Access Control-Control Element (MAC-CE) indicating a change of the SCG to the MCG; and receiving, from the network corresponding to the SCG, RRC reconfiguration information, wherein the RRC reconfiguration information includes information about configuring the SCG as the MCG.

2. The method of claim 1, wherein the MCG failure information comprises at least one of an indication of the RLF for the MCG, a reason for the RLF for the MCG, or a neighbouring cell measurement report indicating at least a signal strength of one or more neighbouring cell groups of the UE.

3. The method of claim 1, wherein the UE assistance information includes information indicating at least one of a preference for configuring the SCG as the MCG, and a status report of the UE wherein the RRC reconfiguration information is based on the transmitted MCG failure information and the UE assistance information.

4. The method of claim 3, wherein the UE assistance information comprises configuration information required for configuring the SCG as the MCG.

5. The method of claim 1, further comprising:

transmitting, to the network corresponding to the SCG, physical uplink shared channel, PUSCH, data containing the MAC-CE, wherein the MAC-CE includes information indicating a preference for configuring the SCG as the MCG, and a status report of the UE, wherein the RRC reconfiguration information is based on the MCG failure information and the PUSCH data.

6. The method of claim 1, wherein the MCG and SCG is associated with one or more types of networks, and the one or more types of networks correspond to at least one of a Terrestrial Network (TN) or a Non-Terrestrial Network (NTN).

7. A method for managing master cell group (MCG) failure by an apparatus of a network associated with a secondary cell group (SCG), the method comprising:

establishing a radio resource control (RRC) connection for the SCG with a user equipment (UE) which established a RRC connection with an MCG;

receiving, from the UE, MCG failure information for a radio link failure (RLF) for the MCG;

receiving, from the UE, UE assistance information or Medium Access Control-Control Element (MAC-CE) indicating a change of the SCG to the MCG;

reconfiguring the SCG as the MCG based on the received UE assistance information or the received MAC-CE;

generating RRC reconfiguration information corresponding to the reconfiguration of the SCG as the MCG; and transmitting, to the UE, the RRC reconfiguration information.

8. The method of claim 7, wherein the UE assistance information includes information indicating at least one of a preference for configuring the SCG as the MCG, and a status report of the UE, wherein reconfiguring the SCG as the MCG is based on the MCG failure information and the UE assistance information.

9. The method of claim 7, wherein the MCG failure information further comprises a neighbouring cell measurement report including information indicating at least a signal strength of one or more neighbouring cell groups of the UE, and wherein the method further comprises:

determining to reconfigure at least one of the SCG or the one or more neighbouring cell groups as the MCG based on the neighbouring cell measurement report.

10. The method of claim 7, further comprising:

receiving, from the UE, physical uplink shared channel (PUSCH) data containing the MAC-CE, wherein the MAC-CE includes information indicating a preference for configuring the SCG as the MCG, and a status report of the UE, wherein reconfiguring the SCG as the MCG is based on the MCG failure information and the PUSCH data.

11. The method of claim 7, wherein the MCG failure information includes a reason for the RLF for the MCG.

12. The method of claim 7, wherein the MCG and SCG is associated with one or more types of networks, and the one or more types of networks correspond to at least one of a Terrestrial Network (TN) or a Non-Terrestrial Network (NTN).

13. A user equipment supporting a dual connectivity for managing master cell group (MCG) failure in a wireless communication system, the UE comprising:

a memory storing instructions; and at least one processor including processing circuitry configured to, when executing the instructions, cause the UE to perform operations, the operations comprising:

establishing a radio resource control (RRC) connection with an MCG and a secondary cell group (SCG);

detecting a radio link failure (RLF) for the MCG;

transmitting, to a network corresponding to the SCG, MCG failure information upon detecting the RLF for the MCG;

transmitting, to a network corresponding to the SCG, UE assistance information or Medium Access Control-Control Element (MAC-CE) indicating a change of the SCG to the MCG; and receiving, from the network corresponding to the SCG, RRC reconfiguration information, wherein the RRC reconfiguration information includes information about configuring the SCG as the MCG.

14. The UE of claim 13, wherein the MCG failure information comprises at least one of an indication of the RLF for the MCG, a reason for the RLF for the MCG, or a neighbouring cell measurement report indicating at least a signal strength of one or more neighbouring cell groups of the UE.

15. The UE of claim 13, wherein the UE assistance information includes information indicating at least one of a preference for configuring the SCG as the MCG, and a status report of the UE, wherein the RRC reconfiguration information is based on the transmitted MCG failure information and the UE assistance information.

16. The UE of claim 15, wherein the UE assistance information comprises configuration information required for configuring the SCG as the MCG.

17. The UE of claim 13, wherein the operations further comprise:

transmitting, to the network corresponding to the SCG, physical uplink shared channel (PUSCH) data containing the MAC-CE, wherein the MAC-CE includes information indicating a preference for configuring the SCG as the MCG, and a status report of the UE, wherein the RRC reconfiguration information is based on the MCG failure information and the PUSCH data.

18. The UE of claim 13, wherein the MCG and SCG is associated with one or more types of networks, and the one or more types of networks correspond to at least one of a Terrestrial Network (TN) or a Non-Terrestrial Network (NTN).

* * * * *